(12) United States Patent
Wadley et al.

(10) Patent No.: US 8,360,361 B2
(45) Date of Patent: Jan. 29, 2013

(54) METHOD AND APPARATUS FOR JET BLAST DEFLECTION

(75) Inventors: Haydn N. G. Wadley, Keswick, VA (US); Douglas T. Queheillalt, Charlottesville, VA (US); Hossein Haj-Hariri, Charlottesville, VA (US); Anthony G. Evans, Santa Barbara, CA (US); George P. Peterson, Boulder, CO (US); Robert Kurtz, Charlottesville, VA (US); G. Douglas Long, Charlottesville, VA (US); Yellapu V. Murty, Charlottesville, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 784 days.

(21) Appl. No.: 12/301,916

(22) PCT Filed: May 23, 2007

(86) PCT No.: PCT/US2007/012268
§ 371 (c)(1),
(2), (4) Date: Oct. 7, 2009

(87) PCT Pub. No.: WO2007/139814
PCT Pub. Date: Dec. 6, 2007

(65) Prior Publication Data
US 2011/0042512 A1     Feb. 24, 2011

Related U.S. Application Data

(60) Provisional application No. 60/802,624, filed on May 23, 2006, provisional application No. 60/802,623, filed on May 23, 2006, provisional application No. 60/818,099, filed on Jun. 30, 2006, provisional application No. 60/833,326, filed on Jul. 26, 2006.

(51) Int. Cl.
*B64F 1/26* (2006.01)
(52) U.S. Cl. .................................................. 244/114 B
(58) Field of Classification Search .............. 244/114 B, 244/129.2, 114 R
See application file for complete search history.

(56) References Cited

U.S. PATENT DOCUMENTS

| | | | |
|---|---|---|---|
| 1,154,254 A | 9/1915 | Lachman | |
| 2,288,104 A | 6/1942 | Pasquier | |
| 2,481,046 A | 9/1949 | Scurlock | |
| 2,692,024 A | * 10/1954 | Burdett, Jr. et al. | 181/221 |
| 2,726,830 A | * 12/1955 | Brown et al. | 181/210 |

(Continued)

FOREIGN PATENT DOCUMENTS

| | | |
|---|---|---|
| JP | 1147294 | 6/1989 |
| WO | WO 01/92001 | 12/2001 |

(Continued)

*Primary Examiner* — Christopher P Ellis
(74) *Attorney, Agent, or Firm* — Novak Druce DeLuca + Quigg LLP; Robert J. Decker

(57) ABSTRACT

Methods and apparatuses for passive jet blast deflection or the like. Use of the passive jet blast deflector permits the efficient dispersal of a fast moving local heat source into the environment through passive means while providing a high strength structure. The jet blast deflector system may include a first plate, a second plate, and a cellular core disposed between them adapted to allow cooling ambient air to flow through the cellular core, wherein the first plate, second plate, and core are all seamlessly coupled heat pipes that form a single vapor core to facilitate the spreading and even storing of thermal energy. An ejector plate may be attached to the top of the second plate to create a low pressure zone as the heat source passes over it, thereby pulling the ambient air through the cellular core, facilitating the removal the thermal energy from the system.

61 Claims, 11 Drawing Sheets

U.S. PATENT DOCUMENTS

| | | | |
|---|---|---|---|
| 2,789,076 A | 4/1957 | Frieder | |
| 2,826,382 A * | 3/1958 | Hayden | 181/210 |
| 3,037,726 A * | 6/1962 | Phillips | 244/114 B |
| 3,087,693 A * | 4/1963 | Nicholson et al. | 244/114 B |
| 3,096,956 A * | 7/1963 | Oestrich | 244/114 B |
| 3,191,728 A * | 6/1965 | Fernand | 52/473 |
| 3,298,402 A | 1/1967 | Hale | |
| 3,436,036 A * | 4/1969 | Madelung | 244/114 R |
| 3,645,478 A * | 2/1972 | Madelung | 244/114 B |
| 3,783,969 A | 1/1974 | Pall | |
| 3,795,288 A | 3/1974 | Pall | |
| 3,857,217 A | 12/1974 | Reps | |
| 3,869,778 A | 3/1975 | Yancey | |
| 3,971,072 A | 7/1976 | Armellino | |
| 3,996,082 A | 12/1976 | Leatherman | |
| 4,001,478 A | 1/1977 | King | |
| 4,019,540 A | 4/1977 | Holman | |
| 4,027,476 A | 6/1977 | Schmidt | |
| 4,037,751 A | 7/1977 | Miller | |
| 4,038,440 A | 7/1977 | King | |
| 4,067,956 A | 1/1978 | Franklin | |
| 4,129,089 A | 12/1978 | Paidoussis | |
| 4,130,233 A | 12/1978 | Chisholm | |
| 4,194,255 A | 3/1980 | Poppe | |
| 4,223,053 A | 9/1980 | Brogan | |
| 4,291,732 A | 9/1981 | Artzer | |
| 4,450,338 A | 5/1984 | Conn | |
| 4,453,367 A | 6/1984 | Geyer | |
| 4,469,077 A | 9/1984 | Wooldridge | |
| 4,518,444 A | 5/1985 | Albrecht | |
| 4,522,860 A | 6/1985 | Scott | |
| 4,529,640 A | 7/1985 | Brown | |
| 4,530,197 A | 7/1985 | Rainville | |
| 4,531,511 A | 7/1985 | Hochberg | |
| 4,541,594 A * | 9/1985 | Foley | 244/114 B |
| 4,625,710 A | 12/1986 | Harada | |
| 4,632,716 A | 12/1986 | Smith | |
| 4,639,388 A | 1/1987 | Ainsworth | |
| 4,687,702 A | 8/1987 | Monsees | |
| 4,756,943 A | 7/1988 | Koletzko | |
| 4,758,299 A | 7/1988 | Burke | |
| 4,765,396 A | 8/1988 | Seidenberg | |
| 4,806,815 A | 2/1989 | Honma | |
| 4,819,719 A | 4/1989 | Grote | |
| 4,859,541 A | 8/1989 | Maxeiner | |
| 4,864,824 A | 9/1989 | Gabriel | |
| 4,881,981 A | 11/1989 | Thomas | |
| 4,883,116 A | 11/1989 | Seidenberg | |
| 4,916,027 A | 4/1990 | Delmundo | |
| 4,918,281 A | 4/1990 | Blair | |
| 4,923,544 A | 5/1990 | Weisse | |
| 4,955,135 A | 9/1990 | Pinkhasov | |
| 4,958,806 A * | 9/1990 | Sato et al. | 256/12.5 |
| 4,968,367 A | 11/1990 | Diderich | |
| 5,002,378 A | 3/1991 | Colarusso | |
| 5,011,638 A | 4/1991 | Pinkhasov | |
| 5,040,966 A | 8/1991 | Weisse | |
| 5,070,673 A | 12/1991 | Weisse | |
| 5,102,723 A | 4/1992 | Pepin | |
| 5,110,661 A | 5/1992 | Groves | |
| 5,127,609 A | 7/1992 | Lynn | |
| 5,137,058 A | 8/1992 | Anahara | |
| 5,176,641 A | 1/1993 | Idriss | |
| 5,179,043 A | 1/1993 | Weichold | |
| 5,181,549 A | 1/1993 | Shapovalov | |
| 5,190,539 A | 3/1993 | Fletcher | |
| 5,217,770 A | 6/1993 | Morris | |
| 5,219,020 A | 6/1993 | Akachi | |
| 5,224,519 A | 7/1993 | Farley | |
| 5,242,321 A | 9/1993 | Gil | |
| 5,263,538 A * | 11/1993 | Amidieu et al. | 165/168 |
| 5,266,279 A | 11/1993 | Haerle | |
| 5,282,861 A | 2/1994 | Kaplan | |
| 5,308,669 A | 5/1994 | Prucher | |
| 5,309,457 A | 5/1994 | Minch | |
| 5,312,660 A | 5/1994 | Morris | |
| 5,349,893 A | 9/1994 | Dunn | |
| 5,360,500 A | 11/1994 | Evans | |
| 5,401,583 A | 3/1995 | Stacher | |
| 5,405,337 A | 4/1995 | Maynard | |
| 5,417,686 A | 5/1995 | Peterson | |
| 5,419,788 A | 5/1995 | Thomas | |
| 5,424,139 A | 6/1995 | Shuler | |
| 5,429,324 A * | 7/1995 | Lynn | 244/114 B |
| 5,431,800 A | 7/1995 | Kirchhoff | |
| 5,442,914 A | 8/1995 | Otsuka | |
| 5,455,096 A | 10/1995 | Toni | |
| 5,465,760 A | 11/1995 | Mohamed | |
| 5,471,905 A | 12/1995 | Martin | |
| 5,472,769 A | 12/1995 | Goerz | |
| 5,503,887 A | 4/1996 | Diaz | |
| 5,511,974 A | 4/1996 | Gordon | |
| 5,527,588 A | 6/1996 | Camarda | |
| 5,527,590 A | 6/1996 | Priluck | |
| 5,534,314 A | 7/1996 | Wadley | |
| 5,536,126 A | 7/1996 | Gross | |
| 5,547,737 A | 8/1996 | Evans | |
| 5,558,304 A | 9/1996 | Adams | |
| 5,591,162 A | 1/1997 | Fletcher | |
| 5,594,330 A | 1/1997 | Jacobsen | |
| 5,597,378 A | 1/1997 | Jervis | |
| 5,598,632 A | 2/1997 | Camarda | |
| 5,605,628 A | 2/1997 | Davidson | |
| 5,607,742 A * | 3/1997 | Ing et al. | 428/98 |
| 5,624,622 A | 4/1997 | Boyce | |
| 5,641,955 A | 6/1997 | Bonniau | |
| 5,642,776 A | 7/1997 | Meyer | |
| 5,654,518 A | 8/1997 | Dobbs | |
| 5,656,984 A | 8/1997 | Paradis | |
| 5,662,294 A | 9/1997 | Maclean | |
| 5,673,571 A | 10/1997 | Moss | |
| 5,677,029 A | 10/1997 | Prevorsek | |
| 5,679,467 A | 10/1997 | Priluck | |
| 5,698,282 A | 12/1997 | DeMeyer | |
| 5,700,337 A | 12/1997 | Jacobs | |
| 5,741,574 A | 4/1998 | Boyce | |
| 5,746,631 A | 5/1998 | McCarthy | |
| 5,771,488 A | 6/1998 | Honkala | |
| 5,772,821 A | 6/1998 | Yasui | |
| 5,773,121 A | 6/1998 | Meteer | |
| 5,804,276 A | 9/1998 | Jacobs | |
| 5,808,866 A | 9/1998 | Porter | |
| 5,817,391 A | 10/1998 | Rock | |
| 5,823,247 A * | 10/1998 | Weibler | 165/76 |
| 5,882,444 A | 3/1999 | Flomenblit | |
| 5,888,609 A | 3/1999 | Karttunen | |
| 5,888,912 A | 3/1999 | Piemonte | |
| 5,890,268 A | 4/1999 | Mullen | |
| 5,924,459 A | 7/1999 | Evans | |
| 5,931,422 A | 8/1999 | Geiger | |
| 5,934,952 A | 8/1999 | Scanlon | |
| 5,941,249 A | 8/1999 | Maynard | |
| 5,943,543 A | 8/1999 | Uchida | |
| 5,962,150 A | 10/1999 | Priluck | |
| 5,964,770 A | 10/1999 | Flomenblit | |
| 5,970,843 A | 10/1999 | Strasser | |
| 5,972,146 A | 10/1999 | Fantino | |
| 5,972,468 A | 10/1999 | Welch | |
| 6,003,591 A | 12/1999 | Campbell | |
| 6,004,330 A | 12/1999 | Middleman | |
| 6,016,888 A * | 1/2000 | Lynn | 181/218 |
| 6,055,123 A | 4/2000 | Kazmierczak | |
| 6,065,934 A | 5/2000 | Jacot | |
| 6,076,324 A | 6/2000 | Daily | |
| 6,077,370 A | 6/2000 | Solntsev | |
| 6,080,495 A | 6/2000 | Wright | |
| 6,082,443 A | 7/2000 | Yamamoto | |
| 6,084,849 A | 7/2000 | Durig | |
| 6,126,371 A | 10/2000 | McCloskey | |
| 6,131,531 A | 10/2000 | McCanna | |
| 6,133,547 A | 10/2000 | Maynard | |
| 6,138,604 A | 10/2000 | Anderson | |
| 6,146,224 A | 11/2000 | McCarthy | |
| 6,149,742 A | 11/2000 | Carpenter | |
| 6,170,202 B1 | 1/2001 | Davoodi | |
| 6,170,560 B1 | 1/2001 | Daily | |
| 6,175,495 B1 | 1/2001 | Batchelder | |

| | | |
|---|---|---|
| 6,176,964 B1 | 1/2001 | Parente |
| 6,182,929 B1 | 2/2001 | Martin |
| 6,189,286 B1 | 2/2001 | Seible |
| 6,200,664 B1 | 3/2001 | Figge |
| 6,204,200 B1 | 3/2001 | Shieh |
| 6,207,256 B1 | 3/2001 | Tashiro |
| 6,209,824 B1 | 4/2001 | Caton |
| 6,217,567 B1 | 4/2001 | Zadno-Azizi |
| 6,220,550 B1 | 4/2001 | McKillip |
| 6,228,744 B1 | 5/2001 | Levine |
| 6,258,118 B1 | 7/2001 | Baum |
| 6,260,567 B1 | 7/2001 | Gruensfelder |
| 6,278,084 B1 | 8/2001 | Maynard |
| 6,284,346 B1 | 9/2001 | Sheridan |
| 6,293,090 B1 | 9/2001 | Olson |
| 6,299,613 B1 | 10/2001 | Ogilvie |
| 6,306,141 B1 | 10/2001 | Jervis |
| 6,318,070 B1 | 11/2001 | Rey |
| 6,345,792 B2 | 2/2002 | Bilanin |
| 6,348,067 B1 | 2/2002 | Baum |
| 6,371,821 B1 | 4/2002 | McCarthy |
| 6,384,707 B2 | 5/2002 | Minners |
| 6,395,018 B1 | 5/2002 | Castaneda |
| 6,402,906 B1 | 6/2002 | Pichulo |
| 6,409,749 B1 | 6/2002 | Maynard |
| 6,417,597 B1 | 7/2002 | Jacobsen |
| 6,419,358 B1 | 7/2002 | Schetky |
| 6,422,010 B1 | 7/2002 | Julien |
| 6,425,343 B1 | 7/2002 | Akers |
| 6,425,829 B1 | 7/2002 | Julien |
| 6,427,712 B1 | 8/2002 | Ashurst |
| 6,427,948 B1 | 8/2002 | Campbell |
| 6,432,134 B1 | 8/2002 | Anson |
| 6,575,113 B1 | 6/2003 | Fischer |
| 6,579,811 B2 | 6/2003 | Narwankar |
| 6,644,535 B2 | 11/2003 | Wallach |
| 6,676,797 B2 | 1/2004 | Tippett |
| 6,684,943 B2 | 2/2004 | Dobbs |
| 6,739,104 B2 | 5/2004 | Tokonabe |
| 6,740,381 B2 | 5/2004 | Day |
| 6,802,477 B2 | 10/2004 | Campion |
| 7,211,348 B2 | 5/2007 | Wadley |
| 7,401,643 B2 | 7/2008 | Queheillalt |
| 7,424,967 B2 | 9/2008 | Ervin |
| 7,437,987 B1 * | 10/2008 | Ohnstad et al. .............. 89/36.04 |
| 2003/0164425 A1 | 9/2003 | Campion |
| 2004/0154252 A1 | 8/2004 | Sypeck |
| 2005/0202206 A1 | 9/2005 | Wadley |
| 2005/0255289 A1 | 11/2005 | Wadley |
| 2006/0080835 A1 | 4/2006 | Kooistra |
| 2008/0226870 A1 | 9/2008 | Sypeck |

FOREIGN PATENT DOCUMENTS

| | | |
|---|---|---|
| WO | WO 02/06747 | 1/2002 |
| WO | WO 0227116 | 4/2002 |
| WO | WO 02/098644 | 12/2002 |
| WO | WO 03/101721 | 12/2003 |
| WO | WO 2004/011245 | 2/2004 |
| WO | WO 2004/022869 | 3/2004 |
| WO | WO 2005/014216 | 2/2005 |

* cited by examiner

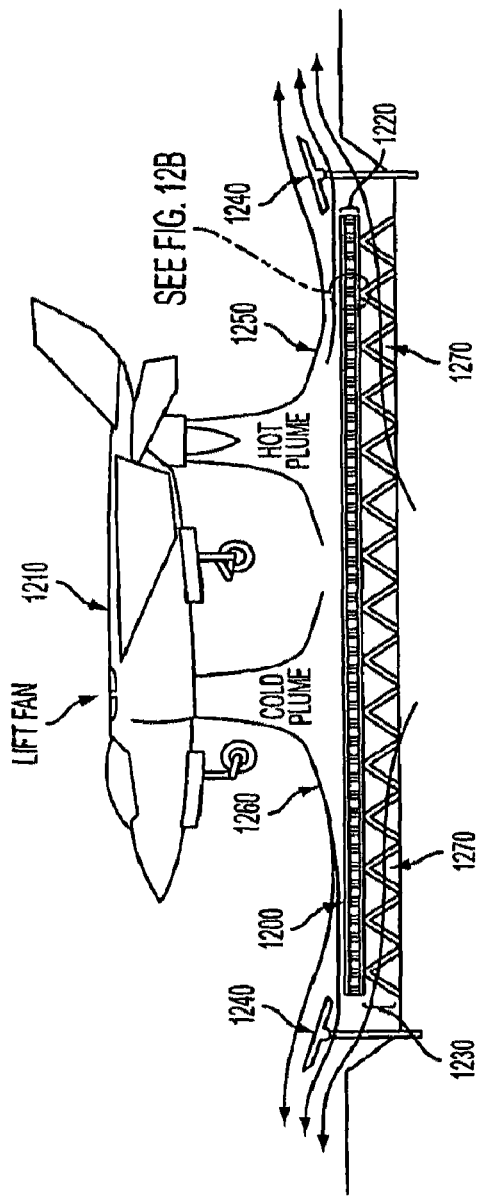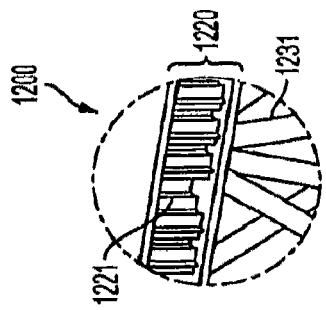
FIG. 12A
FIG. 12B

METHOD AND APPARATUS FOR JET BLAST DEFLECTION

RELATED APPLICATIONS

This application is a national stage filing of International Application No. PCT/US2007/012268, filed May 23, 2007, which claims benefit of priority under 35 U.S.C. section 119(c) from U.S. Provisional Application Ser. No. 60/802,624, filed on May 23, 2006, entitled "Passive Jet Blast Deflectors for Aircraft Carrier Flight Decks and Portable Landing Fields for STOVL Aircraft and Related Method thereof," U.S. Provisional Application Ser. No. 60/818,099, filed on Jun. 30, 2006, entitled "Passive Jet Blast Deflectors for Aircraft Carrier Flight Decks and Portable Landing Fields for STOVL Aircraft and Related Method thereof," U.S. Provisional Application Ser. No. 60/833,326, filed on Jul. 26, 2006, entitled "Passive Jet Blast Deflectors for Aircraft Carrier Flight Decks and Portable Landing Fields for STOVL Aircraft and Related Method thereof," and U.S. Provisional Application Ser. No. 60/802,623, filed on May 23, 2006, entitled "Method of Manufacturing Passive Jet Blast Deflector Heat Exchanges;" of which all of the entire disclosures are hereby incorporated by reference herein in their entirety.

GOVERNMENT SUPPORT

Work described herein was supported by Federal Grant Number N00014-04-1-0299 awarded by the Office of Naval Research and Defense Advanced Research Projects Agency. The United States Government has certain rights in this invention.

FIELD OF INVENTION

This invention relates to a method and apparatus for jet blast deflection, and more specifically to a sandwich structure heat pipe with a cellular core.

BACKGROUND OF THE INVENTION

Aircraft are launched from aircraft carriers using jet blast deflectors (JBDs). They are used to deflect the jet blast upwards and over the flight deck, thereby protecting the ship's superstructure, other planes/equipment and the personnel conducting launch operations (there are many accounts of sailors lost overboard when struck by the blast of modern jets). The engine plume of a modern aircraft engine at full military power deposits an intense thermal flux onto the JBD, which utilizes nonskid coated and water-cooled aluminum panels to deflect the jet plume upward. Cooling is actively achieved using seawater.

When stowed, the JBD is flush with the carrier deck. The JBD panel to which the elevating gear is attached occupies a pit region cut out of the deck. All JBD's in use today are 14' along the vertical edge. When raised to the 50° angle used for a take-off they are 11' in height above the deck. They are made up from 6' wide panels. The Legacy Mk7 Mod 1 JBD is constructed from 4 of these panels (it is therefore 24' wide). The Legacy Mk 7 Mod 2 system has 6 panels. It is therefore 36' in width. Both types are found on all aircraft carriers in service today. JBD panels are raised in pairs by a hydraulic system and linkage assembly. This system is housed in a space beneath the stowed JBD.

The JBD is subjected to a thermal cycle during each launch. First, the JBD is positioned flush with the deck surface so that an aircraft can roll over it and assume its launch position. The JBD is then raised for take-off to provide flight deck protection. Initially, only a fraction of the engine's full military power is applied. However, once a launch decision is made, the JBD is subject to full military power for a specific period of time. In a delayed take-off, the engines are at full power for a significantly longer period. After launch the JBD is quickly rotated flush with the deck to allow the next aircraft to roll over the structure as it is positioned for take-off.

Before a new plane can roll into the launch position, the JBD surface must cool below the temperature that can cause damage to the aircraft tires. The time taken for this determines how quickly the next aircraft can be rolled into position. Since it is desirable to launch the carrier's air wing as quickly as possible, this cooling time needs to be minimized.

Fully armed carrier based aircraft are very heavy. When such an aircraft rolls over the JBD during positioning for take-off, this load is applied to the JBD through the tires. One of the JBD's is located in the aircraft recovery part of the flight deck. If a single wheel strikes the structure during landing, the JBD can experience loads that are much higher than during rollover.

The panels are also subjected to other loads—particularly impacts from accidental tail hook drops and from foreign objects emitted from the engines. These structures must therefore support significant static and dynamic loads. Since the rate at which the JBD surface can be cooled determines how long the next plane must wait before it can cross the JBD, the rate of heat dissipation for these structures is a critical performance metric. JBD's are therefore structures which must support significant compressive and bending stresses while also being capable of rapidly dissipating high heat fluxes.

The current use of a seawater-cooled system results in significant weight and maintenance penalties. The plumbing and water pumping systems contribute a significant amount of weight for each JBD; a Nimitz class aircraft carrier with four catapult launchers therefore has a tremendous amount of topside weight committed to JBD's. Reducing weight is highly desirable, and there is considerable interest in using JBD cooling water for other purposes.

Together with the possibility of a potentially large weight reduction there is therefore a need in alternative approaches for jet blast deflection. Moreover, there is a need in jet blast deflection that can be easily maintained and not disrupt existing launch and aircraft recovery operations.

A limitation in the art is that non passive JBD design still requires blasts of cooling fluid or air to remove the heat input by an aircraft launch.

There is therefore a need for a JBD system and method that may operate in a passive manner.

SUMMARY OF THE INVENTION

An aspect of various embodiments of the present invention system and method provides a novel approach to the passive deflection of jet blasts, and additionally providing superior load bearing capabilities in addition to significant weight reduction. An aspect of various embodiments of the present invention system and method uses passive cooling concepts to more efficiently achieve heat dissipation from the jet blast deflector.

In one aspect, the present invention features a sandwich panel consisting of a first plate and second plate surrounding a cellular core disposed between the two, designed to allow cooling fluid to move through it. In some embodiments, the passive jet blast deflector (p-JBD) is based upon an innovative coupling of thermal spreading concepts (heat pipes and/or heat plates) combined with periodic cellular metal-cored sandwich panels for thermal dissipation by transfer to forced air while also providing exceptional structural efficiency. An aspect provides the localized heat flux deposited into the JBD that can be spread across the front of and into the structure via heat plates and/or heat pipes. This flux can then be conducted into an open cellular structure where it is removed by an air cross-flow running through the cellular structure. The forced air flow is created by the high velocity jet that flows over the top of the JBD and is responsible for inducing the air cross-flow. This air flow is drawn from the ambient air behind the JBD near the deck surface. In addition, significant weight reduction (compared with current equipment) is possible because of, but not limited thereto, the superior load support capabilities of the sandwich panel concept. In this context a passive design is one that does not require a secondary or external coolant flow. In this way, the jet-engine plume's kinetic energy is used remove the heat deposited by its impingement upon the p-JBD structure.

In short; an aspect of an embodiment of the present invention provides the art with a heretofore unappreciated method of passively cooling the jet blast deflector providing superior load bearing capabilities in addition to significant weight reduction.

An aspect of an embodiment of the present invention provides a jet blast deflector system comprising: a first plate/panel; a second plate/panel, and a core disposed between the first plate/panel and second plate/panel, wherein the core is adapted to allow cooling fluid to move through the core.

An aspect of an embodiment of the present invention provides a method of deflecting a jet blast comprising: spreading a thermal component of a jet blast over a jet blast deflector system; storing the thermal component in the jet blast deflector system; and removing the thermal component from the jet blast deflector system with a kinetic component of the jet blast.

An aspect of an embodiment of the provides present invention a method of manufacturing a jet blast deflection system comprising: coupling/joining a first plate/panel, a second plate/panel, and a core disposed between the first plate/panel and second plate/panel, wherein the core is adapted to allow cooling fluid to move through the core and the first plate/panel is adapted to deflect a jet blast.

These and other objects, along with advantages and features of the invention disclosed herein, will be made more apparent from the description, drawings and claims that follow.

BRIEF DESCRIPTION OF THE DRAWINGS

The foregoing and other objects, features and advantages of the present invention, as well as the invention itself, will be more fully understood from the following description of preferred embodiments, when read together with the accompanying drawings, in which:

FIG. 1 is a schematic illustration of a p-JBD system or the like.

FIG. 5(A) is a schematic cross-section illustration of a p-JBD system of the like.

FIGS. 12(A)-(B) are schematic illustrations of a p-JBD variant for STOVL aircraft landing pads.

DETAILED DESCRIPTION OF THE INVENTION

Figure 1:
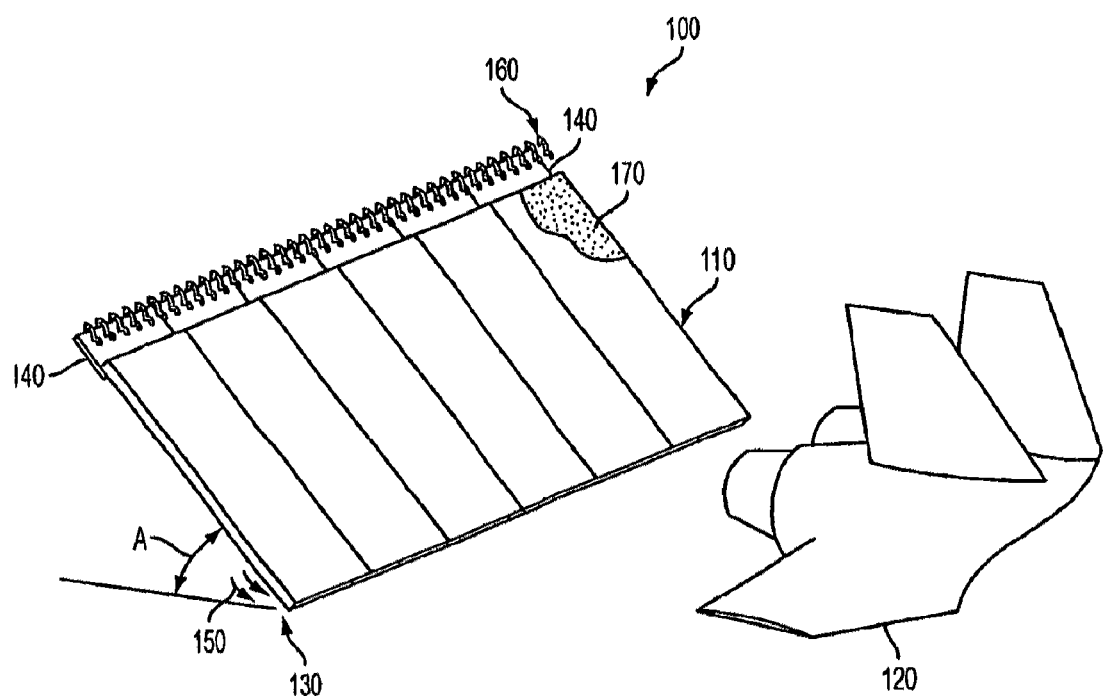

As used herein, references to one or more "embodiments" are to be understood as describing a particular feature, structure, or characteristic included in at least one implementation of the invention. Phrases such as "in one embodiment" or "in an alternate embodiment" appearing herein describe various embodiments and implementations of the invention, and do not necessarily all refer to the same embodiment, nor are they necessarily mutually exclusive. Numerous specific details are set forth though embodiments of the invention may be practiced without these specific details. Descriptions of certain details and implementations follow, with an overview description of embodiments of the invention, followed by a more detailed description with reference to the drawings.

Cellular metal lattice structures offer efficient structural load support and other functionalities such as energy absorption and various forms of thermal management. Low relative density lattices with open cell structures are highly efficient load supporting systems when configured as the cores of sandwich panels, when the core ligaments are loaded in stretching as opposed to bending modes of deformation. These lattice structures contain low flow resistant pathways. When fabricated from high thermal conductivity materials, sandwich panels with these cores can provide efficient cross flow heat exchange. They are therefore excellent candidates for creating very lightweight multifunctional structures combining load support and thermal management.

As the mechanical load that must be supported increases, the core relative density must also be increased. For core relative densities above roughly two percent, metal honeycomb sandwich structures become more efficient than lattices during out-of-plane compression. These closed cell structures cannot be used for cross flow heat exchange. The heat that can be propagated in the out-of-plane direction (i.e. through the webs) depends on the thermal conductivity of the face sheets/webs, the core volume fraction and contribution of convective mechanisms within the core. The dissipation of a localized thermal flux applied to one surface of a honeycomb sandwich structure requires heat to first be transported over the heated face sheet and through the core elements to the opposite face sheet. This can then be ejected to the ambient air via radiation and natural convection. Much more effective transport can be achieved by exploiting convective processes within the sandwich structure, and heat pipe/plate structures are a highly effective means for doing this.

Heat pipes contain hollow interior regions connecting areas close to the source of heat with others that are cooler. The interior surfaces of this hollow space are covered with a fluid loaded, wick structure which facilitates capillary driven fluid flow. The system, once evacuated and sealed, acts like a closed-loop two-phase convective system. Heat applied locally to the structure evaporates the fluid and this vapor is rapidly transported to cooler regions where condensation occurs. The evaporating liquid in the hot (evaporator) part of the system is continually replenished by the capillary pumping of the fluid that condenses in the cooler regions. This closed cycle has, among other things, two important consequences: it can result in structures that posses very high specific thermal capacities (because of the very high heat of vaporization for some fluids) and the systems acts as though it has a very high "effective" thermal conductivity because significant thermal energy is transported in the vapor by the latent heat of vaporization/condensation.

A heat pipe is a closed system, which transfers heat (nearly isothermally) by the evaporation and condensation of a working fluid. Evaporation of the working fluid occurs in the hot region and the latent heat of vaporization is absorbed in the vaporization process. The evaporation results in a slight internal temperature increase and, hence, a pressure differential that causes the vapor to flow from the hot evaporator region to the cooler condenser region. The vapor travels rapidly to the condenser, where it condenses, releasing the heat through condensation. This serves as a very rapid means for transporting thermal energy and isothermalizing a structure. A characteristic of the heat pipe/plate is its ability to produce a surface with a very uniform temperature gradient across it.

An aspect of the present invention p-JBD system and method utilizes a bimodal method of heat extraction. Firstly, the localized heat flux from the aircraft's jet plume is spread (distributed) and temporarily stored throughout the p-JBD module by the use of heat pipe/plate technologies. Secondly, ambient air is drawn into the bottom of the p-JBD, propagated through the heat exchanger core where it absorbs heat, and is then ejected at the top of the p-JBD system.

FIG. 1 is a schematic illustration of one embodiment of p-JBD system 100 interacting with jet 120. When jet 120 emits a jet blast (not pictured), it interacts with p-JBD 110 or the like. The thermal component of the jet blast is absorbed in to the structure of p-JBD 110 or the like and spread across its surface, and the kinetic component of the jet blast is deflected up and over p-JBD 110. As the kinetic component passes over the top of p-JBD 110 it must travel over the deployable ejector plate 140, which creates a low pressure or vacuum region (not pictured) above p-JBD 110 as the kinetic component interacts with the ambient air there. This process pulls cool air 150, brought into p-JBD 110 through inlet 130 at its base up through the p-JBD structure, thus removing the thermal component of the jet blast stored there. As a result hot air 160 is expelled out the top of p-JBD 110. It should be appreciated that in some embodiments, p-JBD 110 may be coated with a spray-on non-skid protective surface 170 or any other form of coating designed to provide traction. Passive in this context implies a system that does not necessarily require an active cooling system. Although, it should be appreciated that an active cooling system may be added, supplemented or implemented with the disclosed cooling system and related method disclosed throughout this document regarding the present invention methods and systems. As shown, the p-JBD 110 comprises a plurality of first plates 112 in communication or joined (e.g., side-by-side or laterally) with one another along with their respective second plates 111 on the back side with a core 114 disposed there between.

It should be appreciated that the raise angle (as referenced as angle "A"), size, surface area, contour, and dimensions of the JBD 110—or any of its related components—may vary as desired or required.

It should be appreciated that any of the present invention system and method disclosed herein may have, but not necessarily the need for a compatible component system, i.e., the wick material, material used for the plates and core that should be compatible in all the embodiments when applicable such that there should not be any corrosion harmful byproducts that affects the safety and performance of the system when in a exposed in a given or applicable working environment.

A wide variety of materials may be utilized for the various components of the systems as desired or required. For example, in some instances the nickel plating may be applied to the interior surfaces of the p-JBD. In some instances, but not limited thereto, the wicking fluid may be high purity water while combatable with the nickel wick that should not come in contact with aluminum surfaces of plates, cores or other applicable components. It should be appreciated that a variety of metals, ceramics and alloys or combination thereof may be implemented as required or desired for any of the components of the present invention system.

Further, during assembly of any of the components related with the present invention JBD system a variety of welding or joining techniques may be applied, including, but not limited thereto, friction stir welding for effective joining. Some of the joints, particularly "lap joints" provide open paths to bare aluminum (or desired or required material) of the plates or cores (for example), which in turn may produce undesirable corrosion product in certain instances. To prevent this, optionally special sealants may be employed which are applied during welding (e.g., friction stir welding or as desired or required) to those lap joints.

Further yet, in some instances during the manufacturing method of various components of the present invention p-JBD system, while employing shaped extrusions special attention may be directed toward minimizing lap welds and thus greatly reducing the length of linear welds that are required.

Figure 2:
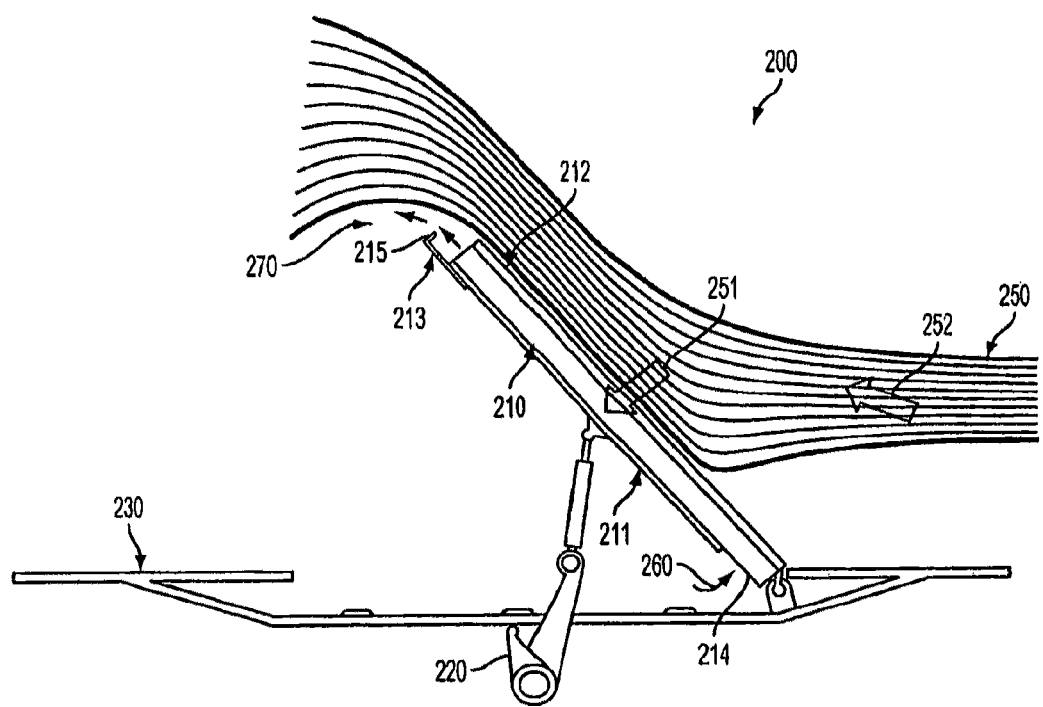
FIG. 2 is a schematic illustration of the p-JBD system or the like in the deployed position interacting with a jet blast.

FIG. 2 is a schematic illustration of one embodiment of p-JBD system 200 or the like. The p-JBD system 200 may be raised into position by elevating gear 220. The ambient cooling airflow in the p-JBD system 200 is generated via an ejector plate 213 which is located at the top of the JBD 200 along its back surface, second plate 211. The ejector plate may be at an alternate location as desired or required and/or may have a have a size and contour as desired or required. When a jet plume, engine exhaust 250 from an aircraft impacts the front surface of the JBD 212, it has two main components to its energy content. First it contains a thermal component 251, which is heat, and is deposited on the front side, or first plate 212, of JBD 200. Secondly, there is a kinetic or mass flow component 252 to the engine exhaust 250. As the kinetic component 252 of the exhaust impacts the JBD's front surface 212, the gas is compressed and directed upwards over the top of the JBD 200. As this flow goes over the top of the JBD 200 it interacts with the ejector plate 213 with lip 215, for example (other sizes and contours of the lip or lip-like structure or function/effect thereof may be implemented as desired or required). This ejector plate 213 creates a low pressure, or vacuum region 270 which draws cool ambient air 260 through the heat exchanger, the cellular core 210 of the p-JBD system 200. In one embodiment, the inlet 214 for this ambient air 260 is located near the bottom of the JBD closest to the aircraft carrier's deck 230. In other embodiments, the inlet could be placed elsewhere as desired or required. In addition to an ambient air inlet, it should be appreciated that cooling fluid may be actively pumped into the core as well. Similarly, it should be appreciated that rather than an ambient air inlet, cooling fluid may be actively pumped into the core instead; or a combination of passive fluid and actively induced fluid.

It should be appreciated that an aspect of the various embodiments of the present invention cooling system and related method disclosed throughout this document may be exclusively passive, passive and active combined, or exclusively active.

Further, it should be appreciated that generally speaking the JBD system or thermal spreading face as disclosed throughout does not necessarily need to be able to recline, be mobile or be deployable, but rather may fixed in a position and/or location if desired or required.

Figure 3:
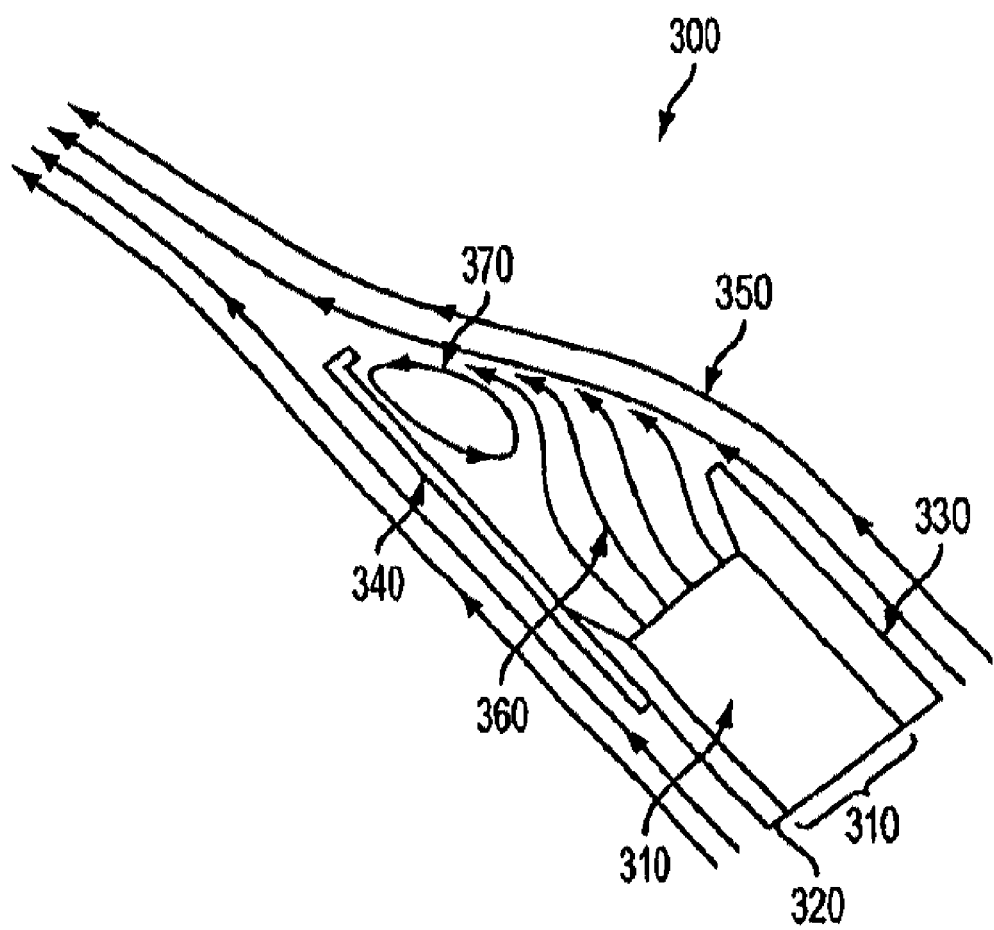
FIG. 3 is a schematic illustration of the ejector plate and the interaction of the jet blast and ambient air.

The amount of air that can be drawn through the p-JBD core may be primarily dictated by the exhaust characteristics of the jet plume 250 (mass flow rate), the geometry of the ejector plate 213 (length), and the friction factor (or flow resistance) of the heat exchanger core 210. FIG. 3 shows a schematic illustration of the ejector plate and the interaction of a jet blast and ambient air drawn through the heat exchanger core; it is a close-up of the top portion of the p-JBD system 300 illustrating the engine exhaust, jet plume 350 and mixing region 370 created by the ejector plate 340. If there were no ejector plate 340 (or equivalent) present, there would be minimal suction through the greater flow-resistance in the cellular core 310 and ambient air 360 would be drawn from behind the p-JBD system 300, instead of through the core, thereby hampering cooling efficiency. If the ejector plate 340 were very long then the streamlines from the incident jet plume 350, the kinetic component, would impact the ejector plate 340 and flow through the core 310, sandwiched between the thermal spreader, first plate 330, and the second plate 320, would be effectively choked off. Therefore, there exists an optimum length for the ejector plate 310 which maximizes the amount of ambient air flow 360 that can be drawn through a particular heat exchanger core 310. Since the geometry of the heat exchanger core 310 in the p-JBD 300 is fixed, the optimal length will depend upon the exhaust characteristics (velocity and mass flow) of the jet plume 350. In one embodiment, the effective length of the ejector plate 340 would be either fixed, for all aircraft launch scenarios; in another embodiment the ejector plate 340 would have a variable length that would be optimized for each individual aircraft launched from a carrier based fleet.

Figure 4B:
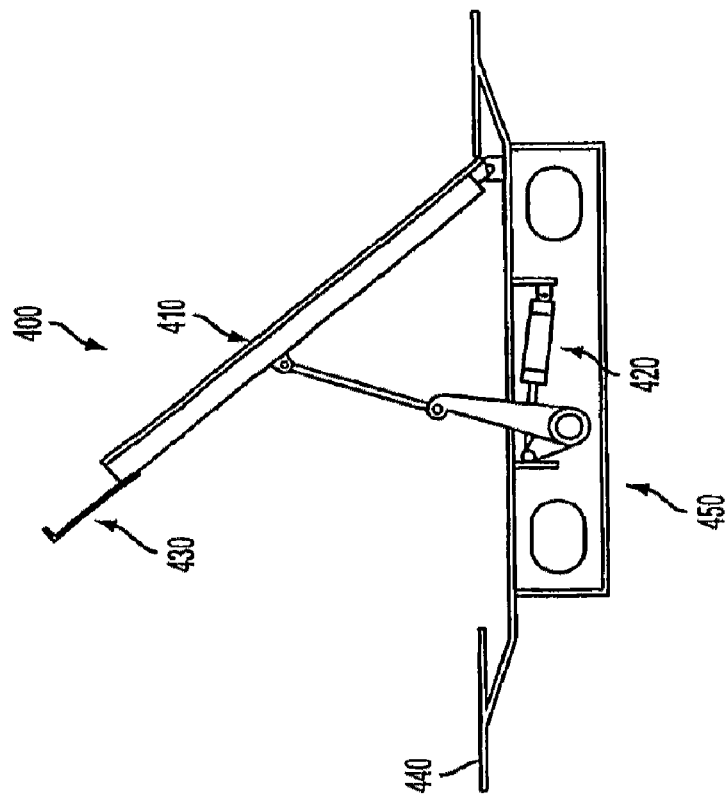
FIG. 4(B) is a schematic illustration of the p-JBD system or the like in the deployed position.
Figure 4A:
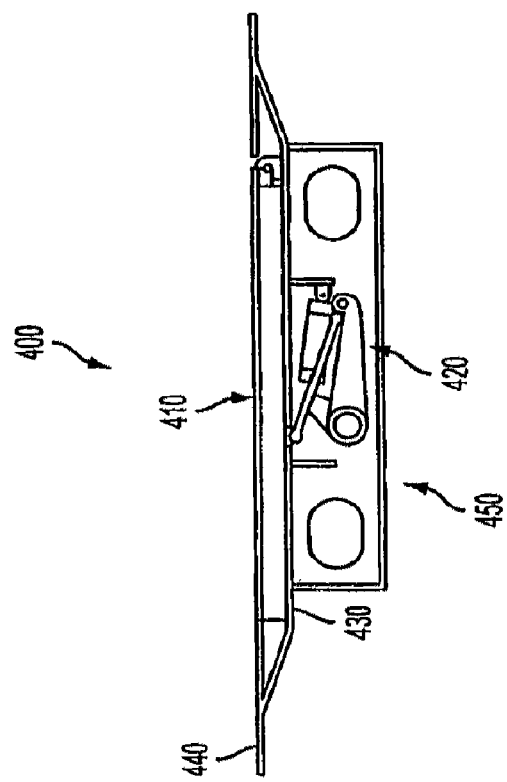
FIG. 4(A) is a schematic illustration of the p-JBD system or the like in the stowed position.

FIG. 4(A) is a schematic illustration of the p-JBD system or the like in the stowed position and FIG. 4(B) is a schematic illustration of the p-JBD system in the deployed position. In one embodiment of the present invention, the p-JBD is used to deflect the jet plumes of aircraft on an aircraft carrier. Referring to FIG. 4(A), when stowed, the p-JBD 410 is flush with the carrier deck 440. The p-JBD panel 410 to which the elevating gear 420 is attached occupies a pit region 450 cut out of the deck 440. Referring to FIG. 4(B), when the p-JBD 410 is in the stowed position, it serves as a deck over which aircraft and carrier personnel may pass. While p-JBD 410 is in the stowed position, ejector plate 430 is also set in its own stowed position, and is not extended. When the p-JBD 410 is in the deployed position, it is capable of deflecting jet blasts to protect aircraft, equipment, and personnel on deck 440. When deployed, p-JBD 410 is lifted out of pit region 450 by elevating gear 420. When p-JBD 410 is deployed, ejector plate 430 is extended into a deployed position as well. In an exemplary approach of an embodiment of the JBD system, the system may utilize the existing hydraulic systems, other applicable system or elevating/stowing/mobilizing gear for panel elevation and stowage.

Figure 5A:
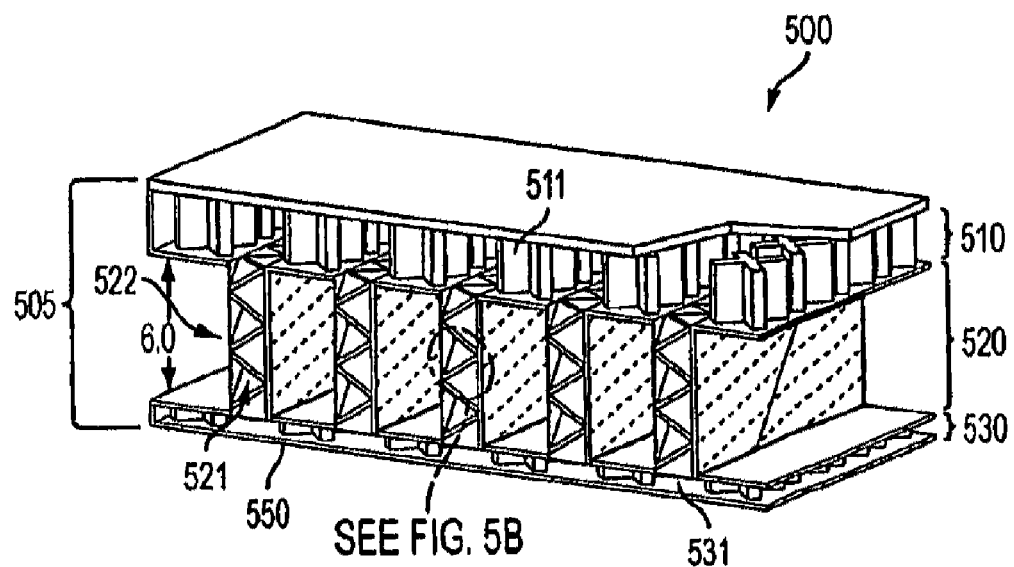
Figure 5B:
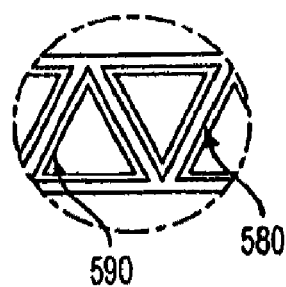
FIG. 5(B) is an enlarged partial schematic view of FIG. 5(A).

FIG. 5(A) is a schematic illustration of a detailed cross section of one embodiment of a p-JBD system 500 or the like. FIG. 5(B) is an enlarged partial schematic view of FIG. 5(A). In addition to serving as a thermal shield during aircraft launching the p-JBD is an integral portion of the aircraft carrier flight deck while stowed. Therefore the p-JBD must support substantial load requirements. In one embodiment, the design can be separated into three distinct components: the first plate 510, which is the front face and serves as a thermal spreader (evaporator), the cellular core 520 which serves as a heat exchanger and the second plate 530, which is the rear face and serves as a fluid reservoir (condenser). In the simplest terms, these three components form a sandwich structure 505 with a series of vertical I-webs 522 forming the cellular core 520. However, the p-JBD is a hierarchical structure in that each of the three main components: the first plate 510, cellular core 520 and rear face 530 are also sandwich structures themselves. In this embodiment, each of the core regions of the front face 510, cellular core 520 and rear face 530 are interconnected forming an intricate network of void space called the vapor core 550. Thus the entire p-JBD serves as a heat plate, promoting bi-modal heat extraction as heat is spread throughout the structure, moving from the first plate 510 though the cellular core 520 to the second plate 530. The unique geometries of these core regions are tailored to support a specific structural load as aircraft and equipment are rolled over the p-JBD's when they are in the stowed position.

In one embodiment of the present invention, I-webs 522 are extruded core elements with angled heat pipe channels and keys to interlock their edges. It should be appreciated that cellular core 520 could be constructed in other ways, such as through the use of a plurality of H-beam structures, I-beam, textile layers, honeycomb or honeycomb-like structures, or corrugated or corrugated-like structures.

It should be appreciated that any or all of the components of the JBD system 500 and any embodiments of the present invention disclosed throughout may be assembled by extruded elements and/or any of the components or portions of components may have portions or segments machined out, removed or shaped. Moreover, it should be appreciated that any or all of the components of the JBD system 500 and any embodiments of the present invention disclosed throughout may be joined using any type of welding method or any available method of joining or coupling materials or components/structures/devices.

In one embodiment of the present invention, the core support regions 511 and 531 of the first and second plates, respectively are cruciform (cross shaped) elements. It is envisioned that any shape element can be used in place of the cruciform elements as long as they provide the necessary structural integrity and support the thermal requirements. This is also the case for the core elements 521 of the cellular core 520, which are shown as simple corrugations. For the embodiment shown in FIG. 5, friction stir welding is a method of joining or coupling the components. However, it is envisioned that any standard method of joining materials, as well as coupling may be used.

As heat is applied locally to the structure, the working fluid evaporates and the vapor is rapidly transported to cooler regions where condensation occurs. In order to replenish the evaporated liquid in the hot (evaporator) part of the system, such as first plate 510, capillary pumping of the fluid that condenses in the cooler regions, such as second plate 530, may be necessary. This is accomplished by the use of a wicking material 590 which lines all internal surfaces of the p-JBD module. This wick material 590 provides a dual role in the heat pipes operation. First, it acts as the fluid reservoir or storage region and secondly it provides the capillary pumping required replenishing the working fluid to the evaporator region.

Figure 6:
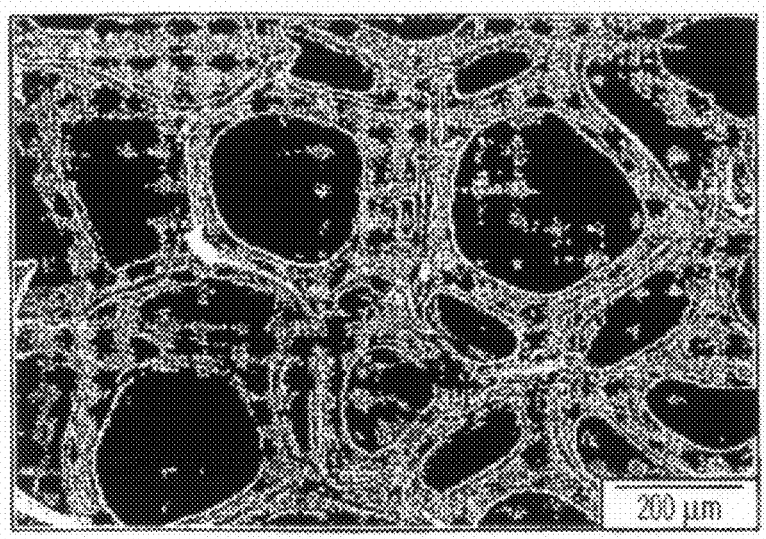
FIG. 6 is an electron micrograph of a stochastic open-cell nickel foam wick.

In one embodiment, INCOFOAM® nickel foam (Ni foam) can be used as the wicking material for the flat heat pipe thermal spreader, such as first plate 510 in FIG. 5. In such an embodiment, Ni foam (or any available, desirable, required material) could as serve as the wicking material covering the interior regions of cellular core 520 and second plate 530 by coating such elements as extruded heat pipe section 580, and core support regions 511 and 531. For example, INCOFOAM® is a high-purity (>99.98% wt.) stochastic open-cell foam material which is produced by chemical vapor deposition of nickel tetracarbonyl (Ni(CO)$_4$) onto an open-cell polyurethane substrate, followed by a high-temperature (~1,000° C.) (or any available, desirable, required temperatures or materials) heat treatment which burns out the polymer foam template and sinters/anneals the nickel ligaments. The as-received nickel foam has a thickness of 1.95 mm and an area density of 500 g/m$^2$ (or any available, desirable, required thickness or density) which corresponds to a relative density of 0.03. The reported cell size of 90 pores per inch (PPI) corresponds to an average cell size (diameter) of ~600 μm (or any available, desirable, required size), as shown in FIG. 6.

As a first estimate, a porous solid can be modeled as an array of parallel capillary cylindrical tubes. The rise in a column of an incompressible fluid in a capillary tube is known as the capillary rise problem. Here, the capillary rise problem is developed for a single capillary tube and then the analysis extended to stochastic open-cell nickel foams. Consider a single capillary tube with one end inserted in a liquid bath. The force balance in the vertical direction can be described by the Young-Laplace equation:

$$P_v - P_l = \frac{2\sigma \cos\theta}{r} \quad (1)$$

where $P_v$ and $P_l$ are the pressure of the vapor and liquid, respectively, σ the surface tension of the liquid, θ the contact angle of the liquid and r the radius of the capillary tube. Assuming a condition of equilibrium exists, the height of the liquid within the capillary tube is expressed as:

$$h = \frac{2\sigma \cos\theta}{gr(\rho_l - \rho_v)} \quad (2)$$

where g is the acceleration due to gravity (9.8 m/s$^2$) and $\rho_v$ and $\rho_l$ are the densities of the vapor and liquid phases. Assuming, σ=0.061 N/m, $\rho_l$=958.3 kg/m$^3$, $\rho_v$=0.597 kg/m$^3$ and good wetability cos θ=1, the equilibrium height of water in a capillary tube can be predicted by Eqn. (3).

Figure 7:
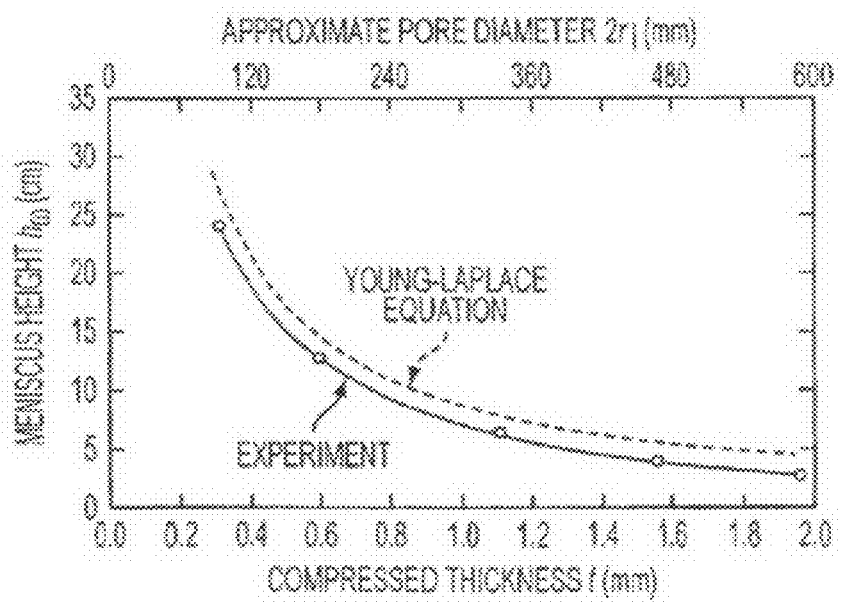
FIG. 7 is a graphical plot of the effect of compressed pore modification's affect on the wicking height of stochastic open-cell foams.

The expression for the equilibrium height for a single capillary tube can be extrapolated to the stochastic open-cell nickel foam. Strips of the foam ~25 mm wide by ~300 mm long were cut and compressed (in thickness) varying amounts to modify the effective pore size/shape and suspended in a container of deionized water and the equilibrium height of the water rise measured (or any available, desirable, required size, width or length). The effective pore diameter, d, of the compressed foam can be expressed as:

$$d = d_o \frac{t}{t_o} \quad (3)$$

where $d_o$ is the initial average pore size of the as-received foam (~600 μm), t the thickness of the compressed foam and $t_o$ the thickness of the as-received foam (1.95 mm) assuming that during compression, deformation is constrained in the through thickness direction (or any available, desirable, required length or size). FIG. 7 is a graphical plot of the effect of compressed pore modification's affect on the wicking height of stochastic open-cell foams and it shows the experimentally measured equilibrium height for the compressed nickel foam as well as the predicted capillary rise in a single tube of equivalent pore size as a function of compression ratio, $t/t_o$, and the corresponding effective pore diameter, d serves as a guideline for the wicking ability of these compressed stochastic open-cell nickel foams.

The wicking structure 590 in FIG. 5 may serve two main functions in the heat pipe operation: it is the vehicle through which, and provides the mechanism by which the working fluid is returned from the condenser, such as second plate 530, to the evaporator, such as first plate 510, and also ensures that the working fluid is evenly distributed over the evaporator surface. While one embodiment employs a stochastic open-cell foam, such as wicking structure 590, in other embodiments numerous wick topologies, including, but not limited to woven mesh screens, sintered metal fibers and powders and small grooves within the heat pipe walls, which are well known in prior art, are applicable for use in the p-JBD system.

Figure 8A:
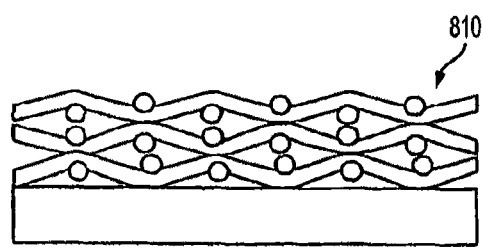
FIG. 8(A) is a schematic illustration of a woven mesh screen wick structure suitable for heat pipe and/or plate structures.
Figure 8B:
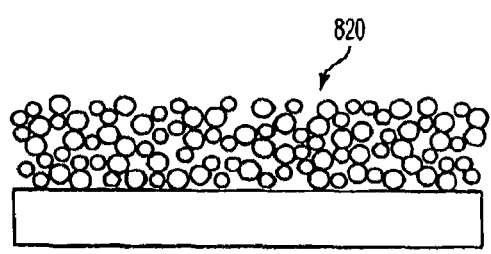
FIG. 8(B) is a schematic illustration of a sintered metal powder wick structure suitable for heat pipe and/or plate structures.
Figure 8C:
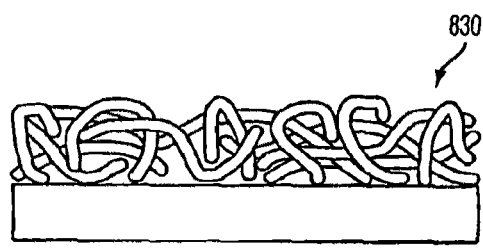
FIG. 8(C) is a schematic illustration of a sintered metal fiber wick structure suitable for heat pipe and/or plate structures.
Figure 8D:
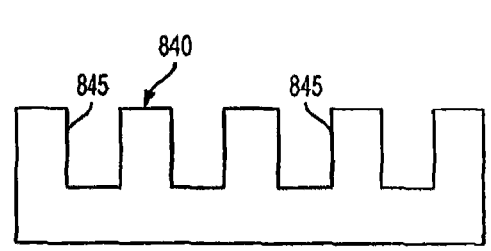
FIG. 8(D) is a schematic illustration of grooves in a heat pipe wall wick structure suitable for heat pipe and/or plate structures.
Figure 9:
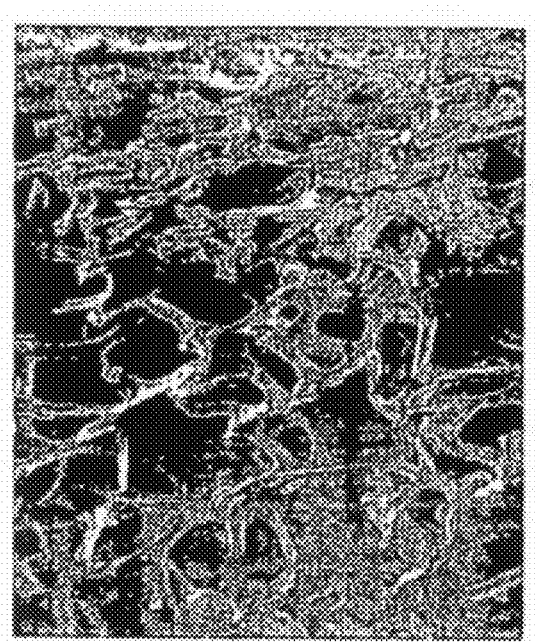
FIG. 9 is an electron micrograph depiction of a graded pore wick structure.
Figure 10:
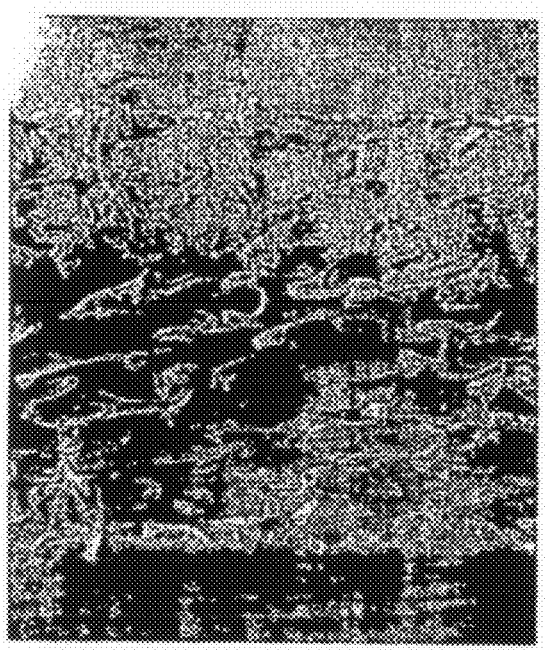
FIG. 10 is an electron micrograph of a graded pore wick structure.

FIGS. 8(A)-(D) show schematic illustrations of alternate wicking topologies. In one embodiment, a wicking topology such as a woven mesh screen 810 depicted in FIG. 8(A) would be employed. In an alternative embodiment, a sintered metal powder 820 or other material as depicted in FIG. 8(B) could be used as the wicking topology. In yet another embodiment, a sintered metal fiber 830 or other material as depicted in FIG. 8(C) could be used as the wicking topology. Yet another alternative embodiment would employ a simple wicking topology of small grooves 845 in the heat pipe walls 840 as shown in FIG. 8(D). In order to provide a low resistance flow path through which the liquid can be returned from the condenser, such as first plate 530 of FIG. 5, to the evaporator, such as second plate 510 of FIG. 5, an open porous structure with a high permeability is desirable. However, to increase the capillary pumping pressure, a small pare size is necessary. Solutions to this apparent dichotomy can be achieved through the use of non-homogenous wicks made of several different materials or through the use of graded pore density structures. FIG. 9 and FIG. 10 are electron micrograph depictions of two different graded pore wick structures manufactured by sintering several lawyers of compressed open-cell nickel foam together.

In one embodiment, the present invention can be used to passively deflect hot gas jets, such as those from an aircraft engine, as described above. In other embodiments, the invention also provides means for accomplishing the more general goal of dispersing an intense local heat source, such as a gas jet plume (when present) into the environment while also providing a high strength structure. Thus in alternative embodiments, the p-JBD system or the like may also be used for other localized heat sources such as gas turbine engines or other hot, fast moving (high kinetic energy) gas streams without regards to their means of production.

In an alternative embodiment, the p-JBD could support an F-35 Joint Strike Fighter (JSF) or any aircraft or spacecraft. The F-35 (JSF) is designed to replace aging fighter inventories. The F-35 will be manufactured in three versions: one for conventional-takeoff-and-landing (CTOL), an aircraft-carrier version (CV) and a short-takeoff/vertical landing variant (STOVL). During landing of the STOVL F-35 JSF, the thrust vectoring exhaust nozzle is directed downward (the same direction as the lift fan) and the aircraft lands vertically. In this scenario, the hot exhaust gases heat the landing pad leading to a wide range of thermal management issues.

Figure 11A:
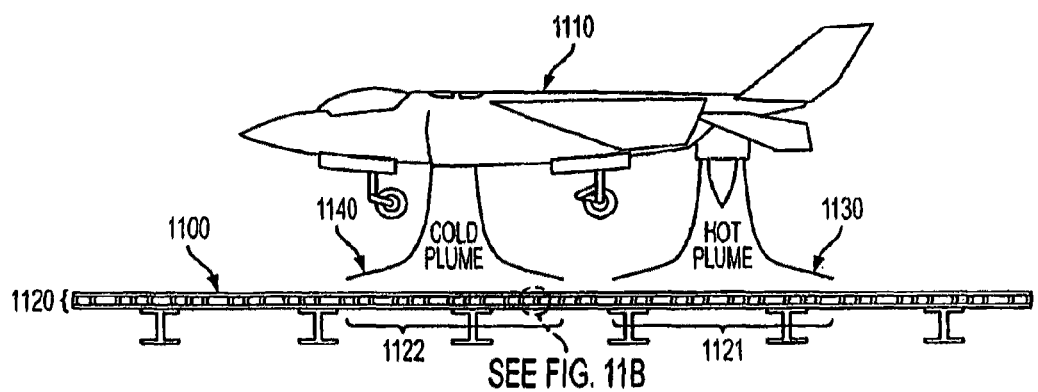
FIGS. 11(A)-(D) are schematic illustrations of a generally flat (or angled or contoured as desired) heat plate variant for STOVL aircraft landing pads.
Figure 11B:
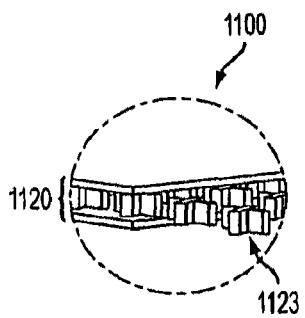
Figure 11C:
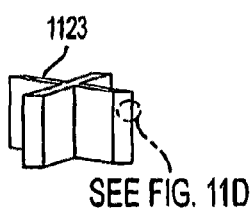
Figure 11D:
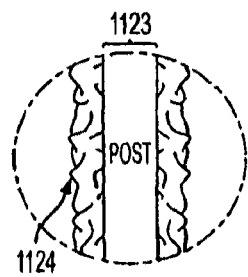

In one embodiment, the flat heat plate thermal spreader portion of the p-JBD system, such as first plate 510 in FIG. 5, can be manufactured as a portable or stationary landing pad. A schematic illustration of such a landing pad 1100 is shown in FIGS. 11(A)-(D). The passive thermal spreader 1120 is composed of core support regions 1123, such as core support region 511 in FIG. 5, which are lined with a wicking structure 1124, such as wicking structure 590 in FIG. 5, thereby enabling the passive thermal spreader 1120 to function as a heat plate. During landing of a STOVL F-35 JSF 1110, both the hot exhaust plum 1130 and cool lift fan gas 1140 are directed downward and onto the passive thermal spreader 1120. The region of the passive thermal spreader 1120 impacted by the hot exhaust gas plum 1130 becomes the evaporator 1121 and the region impacted by the cool lift fan gas 1140 serves as the condenser 1122 and heat is removed form the panel via convection from the cool lift fan gas 1140. FIG. 11(B) is an enlarged partial schematic view of the landing pad 1100 of FIG. 11(A) illustrating the core support region 1123. FIG. 11(C) is an enlarged partial schematic view of the core support region 1123 of FIG. 11(B). FIG. 11(D) is an enlarged partial schematic view of the core support region 1123 of FIG. 11(C) illustrating the wicking structure 1124.

It should be appreciated that the raise angle, size, surface area, contour, and dimensions of the landing pad 1100 or passive thermal spreader 1120—or any of it's related components—may vary as desired or required for any embodiments discussed herein.

It should be appreciated that any component, subcomponent, system, sub-system, sub-apparatus, or apparatus of the JBD system may comprise any material or combination of materials as required and desired. It should be appreciated that any component, subcomponent, system, sub-system, sub-apparatus, or apparatus of the JBD system may be of any size, dimension, contour, density, weight, location, mobility, portability or stability as desired or required. Still yet, it should be appreciated that any component, subcomponent, system, sub-system, sub-apparatus, or apparatus of the JBD system may be connected, coupled, adjoined, fused, extruded, machined or welded, etc. together as desired or required. Further yet, it should be appreciated that any component, subcomponent, system, sub-system, sub-apparatus, or apparatus of the JBD system may be integrally combined in one module or unit or separately connected, detachable or exchangeable as desired or required.

Another embodiment of the present invention is a portable or stationary landing pad consisting of both the thermal spreading top face, such as first face 510 in FIG. 5, and the heat exchanger, such as cellular core 520 in FIG. 5, similar to the p-JBD module design previously shown. A schematic illustration of such a landing pad is shown in FIG. 12. In this embodiment heat from the hot exhaust plume 1250 of the jet 1210 is removed from the landing pad 1200 via convection of the cool lift fan gas 1260 on the thermal spreading face 1220, such as first plate 510 in FIG. 5, as well as via convection through the heat exchanger, cellular core 1230, such as cellular core 520 in FIG. 5. Ejector plates 1240 located along two edges of the landing pad induce the flow of cooling ambient air from the sides of the landing pad 1200 through the cellular core 1230 much like an embodiment of the p-JBD design for aircraft carrier use, as shown in FIG. 1. The thermal spreading face 1220 is composed of core support regions 1221 that are lined with a wicking structure, such as wicking structure 1124 in FIG. 11, thereby enabling the thermal spreading face 1220 to serve as a heat plate to facilitate the efficient spreading of thermal energy throughout its structure. Cellular core 1230 is composed of pyramidal truss heat pipes 1231 that facilitate the efficient transfer of thermal energy throughout their structure as well. FIG. 12(B) is an enlarged partial schematic view of the landing pad 1200 of FIG. 12(A) illustrating the thermal spreading face 1220 and truss structures 1231 of the cellular core 1230.

Figure 13A:
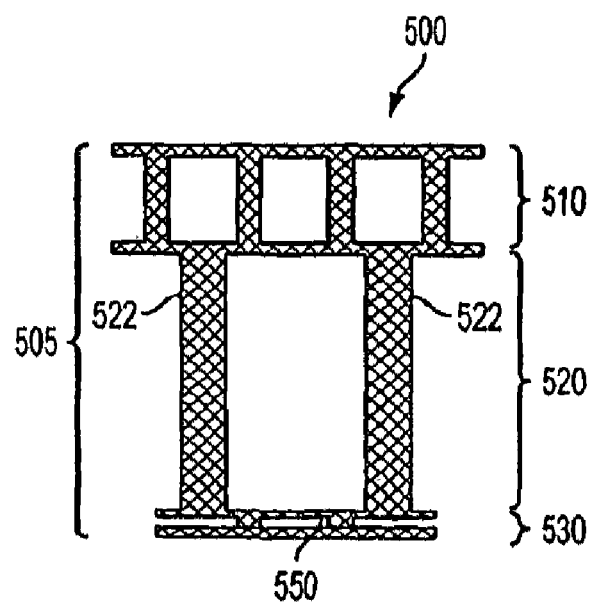
FIGS. 13(A)-(B) are schematic illustrations of a p-JBD system in a cross-section view and perspective view, respectively.
Figure 13B:
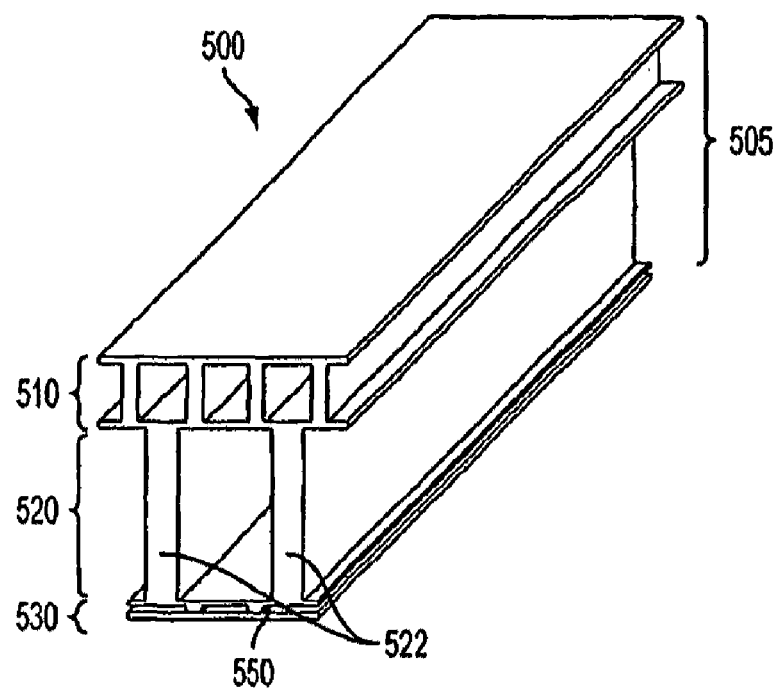

Turning to FIGS. 13(A)-(B), for example, an exemplary non-limiting method of manufacturing is set forth which involves the assembly of extruded aluminum (or a metal, material or combination of materials or metals as desired or required) elements that are joined by welding, for example, friction stir welding to form the panel assembly. Although friction stir welding of aluminum extrusions is the preferred method of joining, it is envisioned that any method can be used to join any metallic extruded elements. A typical cross-section of the extrusion is shown in FIG. 13(A). The extrusions are machined and joined together forming a single JBD module. Various sizes, dimensions and contours may be employed as desired or required. For example, a non-limiting selection may be 6'×14' single JBD module. FIG. 13(B) shows a single extrusion. The width of the extrusions may vary as desired or required. In one aspect the width of the extrusion may be limited by the billet size of the starting material. In summary, an aspect of various embodiments of the present invention discussed throughout provides, but not limited thereto, a novel method (and related structure) of manufacturing a passive JBD which employs an integrated multifunctional concept encompassing all structural and thermal requirements. The concept integrates heat pipe technology into a structural sandwich panel forming the passive modules by joining extruded elements.

Still referring to FIGS. 13(A)-(B), in an exemplary embodiment of the p-JBD system 500 or the like, the design can be employed by an extrusion process to provide a first plate 510, which is the front face and serves as a thermal spreader (evaporator) and a cellular core 520 which serves as a heat exchanger. A second plate 530 may be joined (or the second plate may also be part of the extrusion process of first plate 510 and cellular core 520), which is the rear face and serves as a fluid reservoir (condenser). In the simplest terms, these three components form a sandwich structure 505 with a series of vertical I-webs 522 forming the cellular core 520. Alternatively, the p-JBD or the like, may be a hierarchical structure in that each of the three main components: the first plate 510, cellular core 520 and rear face 530 are also sandwich structures themselves. In such an embodiment, but not necessarily, each of the core regions of the front face 510, cellular core 520 and rear face 530 are interconnected forming an intricate network of void space called the vapor core 550. Thus the entire p-JBD serves as a heat plate, promoting bi-modal heat extraction as heat is spread throughout the structure, moving from the first plate 510 though the cellular core 520 to the second plate 530. The unique geometries of these core regions are tailored to support a specific structural load as aircraft and equipment are rolled over the p-JBD's when they are in the stowed position.

In one embodiment of the present invention, I-webs 522 are extruded core elements themselves with angled heat pipe channels and keys to interlock their edges. It should be appreciated that cellular core 520 could be constructed in other ways, such as through the use of a plurality of H-beam structures, I-beam, textile layers, honeycomb or honeycomb-like structures, or corrugated or corrugated-like structures.

In an embodiment, the cores, panels/plates and related sandwich structures may comprise stacked textile layers as taught or disclosed in PCT International Application No. PCT/US01/17363, entitled "Multifunctional Periodic Cellular Solids And The Method of Making Thereof," filed May 29, 2001, and corresponding U.S. application Ser. No. 10/296,728, entitled "Multifunctional Periodic Cellular Solids and the Method of Making Thereof," filed Nov. 25, 2002, of which the entire disclosures are hereby incorporated by reference herein in their entirety. The textile layer related cores and/or panels/plates may comprise tubular filaments, wire filaments, woven mesh, woven material, knitted mesh, braided mesh, triaxial mesh, quasi-triaxial mesh, three-dimensional elements, H-beam, I-beam, corrugated, and Honeycomb.

In an embodiment, the cores and/or panels/plates and related sandwich structures may comprise an open cell having hollow ligaments as discussed in PCT International Application No. PCT/US01/22266, entitled "Method and Apparatus For Heat Exchange Using Hollow Foams and Interconnected Networks and Method of Making the Same," filed Jul. 16, 2001, and corresponding U.S. application Ser. No. 10/333,004, entitled "Heat Exchange Foam," filed Jan. 14, 2003, of which the entire disclosures are hereby incorporated by reference herein in their entirety. Ligaments may be stochastically ordered or periodically ordered. The cores and/or panels/plates may comprise open cell interconnected network having hollow ligaments as well.

In an embodiment, the cores and/or panels/plates and related sandwich structures may comprise three-dimensional space filling layers as taught in PCT International Application No. PCT/US02/17942, entitled "Multifunctional Periodic Cellular Solids And The Method of Making Thereof," filed Jun. 6, 2002, and corresponding U.S. application Ser. No. 10/479,833, entitled "Multifunctional Periodic Cellular Solids And The Method of Making Thereof," filed on Dec. 5, 2003, of which the entire disclosures are hereby incorporated by reference herein in their entirety. The three-dimensional space filling layer related cores and/or panels/plates may comprise out-of-plane truss units. The truss units may be tetrahedral, pyramidal, Kagome, combinations thereof and other non-limiting arrangements.

In an embodiment, the cores and/or panels/plates and related sandwich structures may comprise periodic cellular structure layers as taught in PCT International Application No. PCT/US03/16844, entitled "Method for Manufacture of Periodic Cellular Structure and Resulting Periodic Cellular Structure," filed May 29, 2003, and corresponding U.S. application Ser. No. 10/515,572, entitled "Multifunctional Periodic Cellular Solids And The Method of Making Thereof," filed Nov. 23, 2004, of which the entire disclosures are hereby incorporated by reference herein in their entirety. The periodic cellular structure layer related cores and/or plates/panels may comprise truss elements or units. The truss elements or units may have a plurality of wicking elements located inside to facilitate heat exchange.

In an embodiment, the cores and/or panels/plates and related sandwich structures may comprise one or more arrays of cellular housing layers as taught in PCT International Application No. PCT/US03/23043, entitled "Method for Manufacture of Cellular Materials and Structures for Blast and Impact Mitigation and Resulting Structure," filed Jul. 23, 2003, and corresponding U.S. application Ser. No. 10/522,068, entitled "Multifunctional Periodic Cellular Solids And The Method of Making Thereof," filed Jan. 21, 2005, of which the entire disclosures are hereby incorporated by reference herein in their entirety. The arrays of cellular housing layer related cores and/or plates/panels may comprise interior cellular housing cores disposed therein the housing. Further, there are numerous other functionalities, which can be added into or with these structures making them ideal candidates for "structure plus" multifunctional materials. For example the present invention general structural material may be involved in architecture (for example: pillars, walls, shielding, foundations or floors for tall buildings or pillars, wall shielding floors, for regular buildings and houses), the civil engineering field (for example; road facilities such as noise resistant walls and crash barriers, road paving materials, permanent and portable aircraft landing runways, pipes, segment materials for tunnels, segment materials for underwater tunnels, tube structural materials, main beams of bridges, bridge floors, girders, cross beams of bridges, girder walls, piers, bridge substructures, towers, dikes and dams, guide ways, railroads, ocean structures such as breakwaters and wharf protection for harbor facilities, floating piers/oil excavation or production platforms, airport structures such as runways) and the machine structure field (frame structures for carrying system, carrying pallets, frame structure for robots, etc.), the automobile (the body, frame, doors, chassis, roof and floor, side beams, bumpers, etc.), the ship (main frame of the ship, body, deck, partition wall, wall, etc.), freight car (body, frame, floor, wall, etc.), aircraft (wing, main frame, body floor, etc.), spacecraft (body, frame, floor, wall, etc.), the space station (the main body, floor, wall, etc.), the submarine (the body, frame, wall, etc.), and is related to the structural material which requires extreme dynamic strength.

In an embodiment of the present invention, the core and/or panels/plates and related sandwich structures may comprise a cellular structure and optionally having nodes therein as taught or disclosed in PCT International Application No. PCT/US03/27606, entitled "Method for Manufacture of Truss Core Sandwich. Structures and Related Structures Thereof," filed Sep. 3, 2003, and corresponding U.S. application Ser. No. 10/526,296, entitled "Method for Manufacture of Truss Core Sandwich Structures and Related Structures Thereof," filed Mar. 1, 2005, of which the entire disclosures are hereby incorporated by reference herein in their entirety. The cellular structure layer related cores and/or panels/plates may comprise tetrahedral, pyramidal, Kagome, cone, frustum, or combinations thereof and other non-limiting arrangements.

In an embodiment, the core, first plate/panel, and second plate/panel, and related sandwich structures may comprise a multilayer truss structure as taught in PCT International Application No. PCT/US04/04608, entitled "Methods for Manufacture of Multilayered Multifunctional Truss Structures and Related Structures There from," filed Feb. 17, 2004, and corresponding U.S. application Ser. No. 10/545,042, entitled "Methods for Manufacture of Multilayered Multifunctional Truss Structures and Related Structures Therefrom," filed Aug. 11, 2005, of which the entire disclosures are hereby incorporated by reference herein in their entirety, as well as the related method of manufacturing thereof.

The various embodiments of the present invention disclosed throughout may implement systems, components and methods disclosed in the following U.S. patents and U.S. patent application Publications, and of which are hereby incorporated by reference herein in their entirety:

1. U.S. Pat. No. 6,802,477 B2 to Campion, entitled "Blast Deflector;"

2. U.S. Pat. No. 6,575,113 B1 to Fischer, et. al., entitled "Cooled Jet Blast Deflectors For Aircraft Carrier Decks;"

3. U.S. Pat. No. 5,127,609 to Lynn, entitled "Jet Blast Deflector Fence;"

4, U.S. Patent Application Publication No. 2003/0164425 A1 to Campion, entitled "Blast Deflector."

In summary, while the present invention has been described with respect to specific embodiments, many modifications, variations, alterations, substitutions, and equivalents will be apparent to those skilled in the art. The present invention is not to be limited in scope by the specific embodiment described herein. Indeed, various modifications of the present invention, in addition to those described herein, will be apparent to those of skill in the art from the foregoing description and accompanying drawings. Accordingly, the invention is to be considered as limited only by the spirit and scope of the following claims, including all modifications and equivalents.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Unless clearly specified to the contrary, there is no requirement for any particular described or illustrated activity or element, any particular sequence or such activities, any particular size, speed, material, dimension or frequency, or any particularly interrelationship of such elements. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all sub ranges therein. Any information in any material (e.g., a U.S./foreign patent, U.S./foreign patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

We claim:

1. A jet blast deflector system comprising:
a first plate,
a second plate,
a core disposed between said first plate and second plate, wherein said core is adapted to allow cooling fluid to move through said core, said jet blast deflector system being adapted to absorb a thermal component of a jet blast and to spread said thermal component across a surface of said jet blast deflector system, and to remove said absorbed thermal component from said jet blast deflector system with a kinetic component of said jet blast, and
an ejector plate comprising a lip distal from said second plate, said ejector plate being coupled to said second plate, said ejector plate adapted to promote the mixing of the cooling fluid and the jet blast.

2. The system of claim 1, further comprising:
a fluid inlet in communication with said core to allow the cooling fluid to enter into said core.

3. The system of claim 1, further comprising:
a fluid inlet in communication with said core to allow the cooling fluid to enter into said core.

4. The system of claim 1, further comprising:
a heat pipe disposed on or in said first plate.

5. The system of claim 1, wherein:
said first plate comprises a heat pipe.

6. The system of claim 5, wherein:
said heat pipe comprises a sandwich structure.

7. The system of claim 1, wherein:
any one or more of said first plate, said second plate, and said core comprises a heat pipe.

8. The system of claim 7, wherein:
said heat pipe comprises a sandwich structure.

9. The system of claim 7, wherein:
any one or more of said front plate, said core, and said second plate are coupled forming a single heat pipe.

10. The system of claim 9, wherein:
any one or more of said front plate, said core, and said second plate of said coupled single heat pipe is seamlessly and continuously coupled.

11. The system of claim 9, wherein:
said heat pipe comprises a sandwich structure.

12. The system of claim 1, wherein:
said core comprises a cellular structure with axial channels adapted to allow the cooling fluid to pass through said core.

13. The system of claim 1, wherein:
said core comprises a cellular structure, wherein said cellular structure comprises at least one or more of the following: tetrahedral, pyramidal, kagome, cone, frustum, or combinations thereof.

14. The system of claim 1, wherein:
said core comprises a cellular structure, wherein said cellular structure comprises a plurality of open I-beam or H-beam structures.

15. The system of claim 14, wherein said structures are formed by employing shaped extrusions.

16. The system of claim 1, wherein:
said core comprises a plurality of textile layers.

17. The system of claim 16, wherein:
said textile layers comprise tubular filaments, wire filaments, woven mesh, woven material, knitted mesh, braided mesh, triaxial mesh, quasi-triaxial mesh, three-dimensional elements, and honeycomb or combinations thereof.

18. The system of claim 1, wherein:
said core comprises a corrugated or honeycomb structure.

19. The system of claim 1, wherein:
the cooling fluid is ambient air.

20. The system of claim 1, wherein:
said first plate, said second plate and/or said core comprises at least one of the following materials: metal, metallic or intermetallic alloy, ceramic, composite material, or any combination thereof.

21. A method of deflecting a jet blast comprising:
spreading a thermal component of a jet blast over a jet blast deflector system;
storing said thermal component in said jet blast deflector system; and
removing said thermal component from said jet blast deflector system with a kinetic component of said jet blast; wherein
said jet blast deflector system comprises a first plate, a second plate, a core disposed between said first plate and second plate, wherein said core is adapted to allow cooling fluid to move through said core, and an ejector plate comprising a lip distal from said second plate, said ejector plate being coupled to said second plate, said ejector plate adapted to promote the mixing of the cooling fluid and the jet blast.

22. The method of claim 21, wherein:
said cooling fluid is ambient air.

23. The method of claim 22, wherein:
any one or more of said front plate, said core, and said second plate are seamlessly coupled forming a single, continuous heat pipe.

24. The method of claim 23, wherein:
said spreading of said jet blast through said heat pipe transfers said thermal component throughout said jet blast deflector system.

25. The method of claim 21, wherein:
said removing of said thermal component of said jet blast further comprises sucking of ambient cooling fluid through said core as said kinetic component of said jet blast passes over said ejector plate, thereby facilitating the removal of said thermal component.

26. The method of claim 22, wherein:
said removing of said thermal component of said jet blast further comprises sucking of ambient cooling fluid through said core as said kinetic component of said jet blast is deflected.

27. The method of claim 22, wherein:
said ambient cooling fluid moving through said core and said kinetic component of said jet blast is partially mixed.

28. The method of claim 21, wherein:
any one or more of said front plate, said core, and said second plate are seamlessly coupled by forming a single, continuous heat pipe.

29. The method of claim 21, wherein:
any one or more of said front plate, said core, and said second plate are coupled forming a single heat pipe.

30. The method of claim 29, wherein said heat pipe is formed by employing shaped extrusions.

31. The method of claim 21, wherein:
said removing of said thermal component of said jet blast further comprises sucking of cooling fluid through said core as said kinetic component of said jet blast is deflected.

32. The method of claim 21, wherein:
said cooling fluid moves moving through said core and said kinetic component of said jet blast is partially mixed.

33. The method of claim 21, wherein:
said spreading of said jet blast through said heat pipe transfers said thermal component throughout said jet blast deflector system.

34. A method of manufacturing a jet blast deflection system comprising:
coupling a first plate, a second plate, a core disposed between said first plate and second plate, and an ejector plate comprising a lip distal from said second plate, said ejector plate being coupled to said second plate, said ejector plate adapted to promote the mixing of the cooling fluid and the jet blast, wherein said core is adapted to allow cooling fluid to move through said core and said first plate is adapted to deflect a jet blast.

35. The method of claim 34, wherein:
said coupling comprises a metallurgical bond such as at least one of the following: welding, friction stir welding, or diffusion bonding.

36. The method of claim 34, wherein:
said coupling is provided by an extrusion process.

37. The method of claim 34, wherein:
said coupling is provided by fasteners.

38. The method of claim 37, wherein:
said fasteners comprise bolts, rivets, screws, or the like.

39. The method of claim 34, wherein:
any one or more of said first plate, said second plate, and said core comprises a heat pipe.

40. The method of claim 39, wherein:
said heat pipe comprises a sandwich structure.

41. The method of claim 34, wherein:
any one or more of said front plate, said core, and said second plate are seamlessly coupled forming a single, continuous heat pipe.

42. The method of claim 41, wherein:
said heat pipe comprises a sandwich structure.

43. The method of claim 34, wherein:
any one or more of said front plate, said core, and said second plate are coupled forming a single heat pipe.

44. The method of claim 43, wherein said heat pipe is formed by employing shaped extrusions.

45. The method of claim 41, wherein:
said core comprises a cellular structure with axial channels adapted to allow the cooling fluid to pass through said core.

46. The method of claim 45, wherein said core is formed by employing shaped extrusions.

47. The method of claim 34, wherein:
said core comprises a cellular structure, wherein said cellular structure comprises at least one or more of the following: tetrahedral, pyramidal, kagome, cone, frustum, or combinations thereof.

48. The method of claim 34, wherein:
said core comprises a cellular structure, wherein said cellular structure comprises a plurality of open I-beam or H-beam structures.

49. The method of claim 48, wherein said structures are formed by employing shaped extrusions.

50. The method of claim 34, wherein:
said core comprises a plurality of textile layers.

51. The method of claim 34, wherein:
said text layers comprise tubular filaments, wire filaments, woven mesh, woven material, knitted mesh, braided mesh, triaxial mesh, quasi-triaxial mesh, three-dimensional elements, and honeycomb or combinations thereof.

52. The method of claim 34, wherein:
said core comprises a corrugated or honeycomb structure.

53. The method of claim 34, wherein:
said first plate, said second plate, and/or said core comprises at least one of the following materials: metal, metallic or intermetallic alloy, ceramic, composite material, or any combination thereof.

54. The deflector system of claim 1, further comprising:
an additional one or more first plates,
an additional one or more second plates, and
an additional one or more cores, wherein said additional said one or more cores are disposed between said additional one or more first plates and said additional one or more second plates, wherein said additional one or more cores are adapted to allow cooling fluid to move through said additional one or more cores.

55. The deflector system of claim 54, wherein said first plate, said second plate and said core are in communication with said one or more additional first plates, said one or more additional second plates, and said one or more additional cores.

56. The deflector system of claim 55, wherein said communication comprises: lateral coupling.

57. The deflector system of claim 56, wherein said lateral coupling comprises: welding, friction stir welding, or diffusion bonding, or any combination thereof.

58. The method of claim 34, further comprising:
coupling an additional one or more first plates, an additional one or more second plates, and an additional one or more cores, wherein said additional said one or more cores are disposed between said additional one or more first plates and said additional one or more second plates, wherein said additional one or more cores are adapted to allow cooling fluid to move through said additional one or more cores.

59. The method of claim 58, disposing said first plate, said second plate and said core in communication with said one or more additional first plates, said one or more additional second plates, and said one or more additional cores.

60. The method of claim 59, wherein said communication comprises: lateral coupling.

61. The method of claim 60, wherein said lateral coupling comprises: welding, friction stir welding, or diffusion bonding, or any combination thereof.

\* \* \* \* \*